WILLIAM R. BAKER.
Improvement in Carriage Holdbacks.
No. 114,746.　　　　　　　　　　　　　　　Patented May 16, 1871.
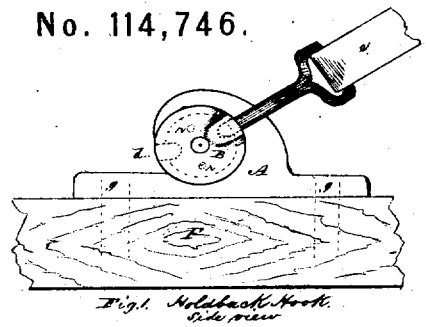
Fig. 1. Holdback Hook. Side view.
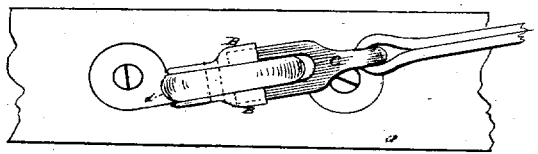
Fig. 2. Top view.
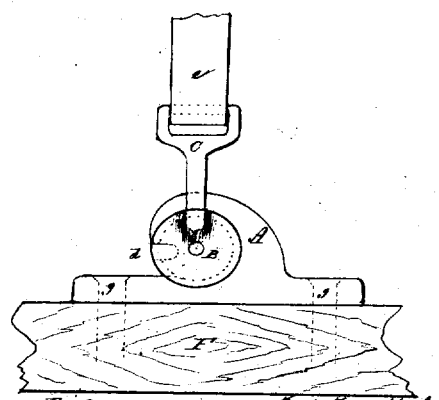
Fig. 3. As a Back Band Hook.
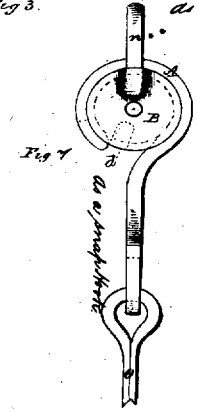
Fig. 7. As a snap hook.
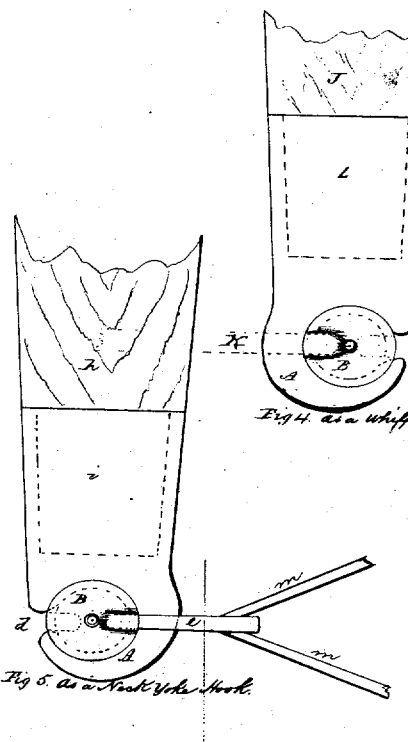
Fig. 4. As a whiffletree Hook.
Fig. 5. As a Neck Yoke Hook.
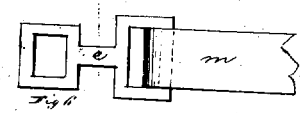
Fig. 6.
O. W. Bruce
P. L. Scriven
Witnesses
William Rondeau Baker
Inventor

United States Patent Office.

WILLIAM RONDEAU BAKER, OF WELLINGTON SQUARE, CANADA.

Letters Patent No. 114,746, dated May 16, 1871.

IMPROVEMENT IN CARRIAGE-HOLDBACKS.

The Schedule referred to in these Letters Patent and making part of the same.

I, WILLIAM RONDEAU BAKER, of Wellington Square, in the county of Halton, in the Province of Ontario, Dominion of Canada, have invented certain new and useful Improvements in Holdback-Hooks for Carriage-Thills and Shafts, to be called or known as "W. R. BAKER'S Safety Holdback and Universal Hook."

The nature of my invention relates to an improved holdback-hook for carriage-shafts, constructed in such a manner as will also answer as a whiffletree-hook, a neck-yoke hook, a back-band hook, and a snap-hook, being a simple yet efficacious device, without springs or complications of any kind, and calculated to save much time and trouble in harnessing and unharnessing horses.

Figure 1 represents a side view of my invention as a holdback-hook.

Figure 2, a top view of same.

Figure 3 is a side view of my invention used as a back-band hook;

Figure 4, as a whiffletree-hook;

Figure 5, as a neck-yoke hook;

Figure 7, as a snap-hook.

F, fig. 1, represents a section of a shaft, upon which is secured, by the screws $g$ $g$, the holdback-hook A.

B is a double-flanged slotted roller, revolving in the inside of the hook A, having a slot cut in one side of it, as shown by the dotted lines.

The breeching-strap is secured as follows:

The square-eyed hook C, to which the above-mentioned strap is fastened, is entered at the front of the device at the opening marked $d$, and both it and the roller B are turned back when they assume the position as shown in fig. 1. The breeching-strap is then secured.

The manner in which the revolving double-flanged roller B is secured in the hook A is as follows:

It is cast solid with one flange, and in that condition is easily placed in the curve of the hook A; the other flange is then riveted on in the usual way.

$r$ $r$, fig. 1, represent small projections in the flange that fit into corresponding holes in the roller to prevent the possibility of the riveted flange from becoming loose.

The roller B is made to fit the hook so as to revolve with ease, and at the same time remain in any position desired.

When the breeching-strap is hooked the whole presents the appearance as in fig. 1.

In unharnessing a horse the traces only require to be unhooked and moved forward out of the shafts; the roller B revolves, and the transverse-eyed hook C of the breeching-strap $e$ is released at the point marked $d$.

This device entirely does away with the old method of winding the strap around the shafts.

Fig. 3 represents the same device adapted as a back-band hook, for supporting the shaft F.

$s$ represents a back-band of a harness with the same transverse-eyed hook attached. It enters at the opening marked $d$, and the slot indicated by the dotted lines is turned upward with the revolution of the roller until the strap is perpendicular, where it remains stationary, as indicated by fig. 3.

The hook is simply screwed to the shaft at the point immediately under the back-band.

Fig. 4 represents a socket, L, cast to the holdback-hook, adapted as a whiffletree-hook.

The end of the whiffletree J is firmly inserted in the socket L, the slotted revolving double-flanged roller B revolving in the hook A, as in figs. 1, 2, and 3.

K represents a cock-eye. It is secured to the hook A by drawing it back and entering it at the opening $d$, when the revolution of the roller carries it to its proper position, as shown by the dotted lines K, fig. 4.

This provides for a simple, durable, and efficacious whiffletree-hook.

Fig. 5 represents the same device used as a neck-yoke hook.

$i$ is a socket cast to the hook A, and fastened to the neck-yoke $h$.

The breast-strap $m$ $m$ passes through the double square-eyed hook $e$, one eye of which enters the slot of the roller B, as before mentioned, for the holdback.

Figure 6 represents a top view of the double square-eyed hook.

Fig. 7 represents the same device as a snap-hook.

B is the slotted roller revolving in the hook A, which has an eyed shank, M, at one end, through which any strap may pass, as $o$.

$n$ is a side view of a ring, which enters the slotted roller at the opening $d$ in the same manner as the others.

The advantages attending the use of my device are as follows:

First, as a holdback-hook it is simple in construction, safe in use, easily hooked and unhooked, free from any danger of getting out of order, as there are no springs of any kind, which are so objectionable in devices of this nature. In case of accident a horse can be easily released. It is also placed diagonally on the shaft parallel with draft of the breeching-strap, thereby avoiding any twist in it. In case of a vicious horse breaking a whiffletree-hook he is at once released upon moving forward.

Second, it is easily adapted as a back-band hook, being a better contrivance for that purpose than that now used.

Third, it makes a durable, efficacious, and safe whiffletree-hook when a socket is attached.

Fourth, it provides a safe, easy, and reliable neck-yoke hook, which allows horses to be released from vehicles when desired under all circumstances.

Fifth, as a snap-hook it is always reliable, as no spring is used in its construction.

The hooks can be made of malleable, cast-iron, brass, or other metal.

Disclaiming all else,

What I claim as my invention consists in—

1. The arrangement and combination of the double-flanged slotted roller B and hook A, substantially as and for the purpose described, or any other purpose to which it can be applied.

2. The combination of the hook A and socket i L, figs. 4 and 5, as shown, for the purposes set forth and specified.

Hamilton, Canada, November 26, 1870.

WILLIAM RONDEAU BAKER.

Witnesses:
 W. BRUCE,
 P. L. SCRIVEN.